Feb. 23, 1926.

C. R. MARTIN 1,574,435

VALVE

Filed April 4, 1923

Inventor
C. R. Martin
by
Attorney

Patented Feb. 23, 1926.

1,574,435

UNITED STATES PATENT OFFICE.

CHARLES R. MARTIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

VALVE.

Application filed April 4, 1923. Serial No. 629,770.

*To all whom it may concern:*

Be it known that CHARLES R. MARTIN, a citizen of the United States, residing at Milwaukee, in the county of Milwaukee and State of Wisconsin, has invented a certain new and useful Valve, of which the following is a specification.

This invention relates in general to improvements in valve structures, and relates more specifically to improvements in the construction and operation of wicket gates or butterfly valves of relatively large sizes.

An object of the invention is to provide an improved valve which is simple in construction and efficient in operation.

In the operation of wicket gates or butterfly valves of relatively large dimensions adapted to control the flow of liquid through pipe lines and the like, it has been found difficult to eliminate shock and water hammer due to the sudden rush of relatively large quantities of liquid from one side of the valve to the other. When operating large valves of this type even relatively slight opening of the valve is accompanied by the passage of relatively large quantities of water which rapidly fill the valve casing and the pipe line on the discharge side of the valve thus producing undesirable shock. In order to prevent such undesirable action when operating large valves of this type, it has heretofore been customary to provide one or more auxiliary valve controlled by-pass connections around the main valve, such by-pass connections serving to gradually fill the space communicating with the discharge side of the main valve and to gradually substantially equalize the pressures on opposite sides thereof. When the by-pass conduit is associated with the main valve casing and has one or more bends therein, the conduit is easily clogged by the accumulation of débris therein. The location of such a conduit at the exterior of the main valve casing is also undesirable due to the additional space occupied by the by-pass beyond that required by the main valve casing. The by-pass should also be formed directly within the main valve structure in order to eliminate joints which are apt to become leaky. In providing such a by-pass every effort must be made to maintain the same in condition for efficient operation at all times and the by-pass should be protected against all possible injury.

The present invention contemplates the provision of a by-pass structure for wicket gates or butterfly valves of relatively large sizes, which is simple and compact in construction, which may be manufactured at minimum cost, which eliminates the use of piping located outside of the valve casing and ordinarily fitted in the field, which eliminates joints which are subject to leakage, which requires no space additional to that occupied by the main valve and casing, and which may be readily operated and maintained in operative condition all times. In accordance with the present invention the by-pass is preferably associated directly with the body of the main valve and is located entirely within the main valve casing, although it may be otherwise associated directly with the main valve. The improved by-pass is preferably located near the central axis of the main valve and is operable from the exterior of the main valve casing to permit gradual flow of liquid past the main valve body.

A clear conception of an embodiment of the present invention and of the operation of devices constructed in accordance therewith, may be had by referring to the drawing accompanying and forming a part of this specification in which like reference characters designate the same or similar parts in the several views.

Figure 1:
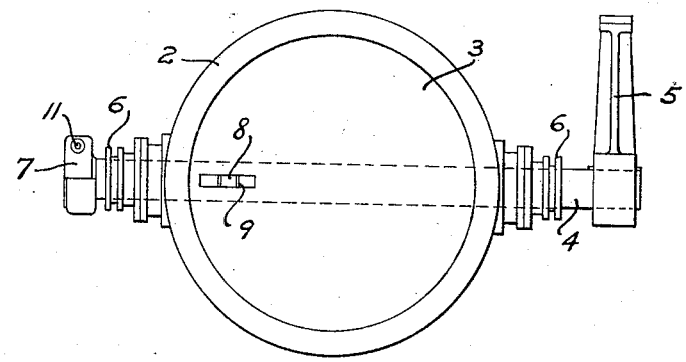
Fig. 1 is a front elevation of a butterfly valve having a by-pass and an auxiliary control valve located within the body of the wicket.
Figure 2:
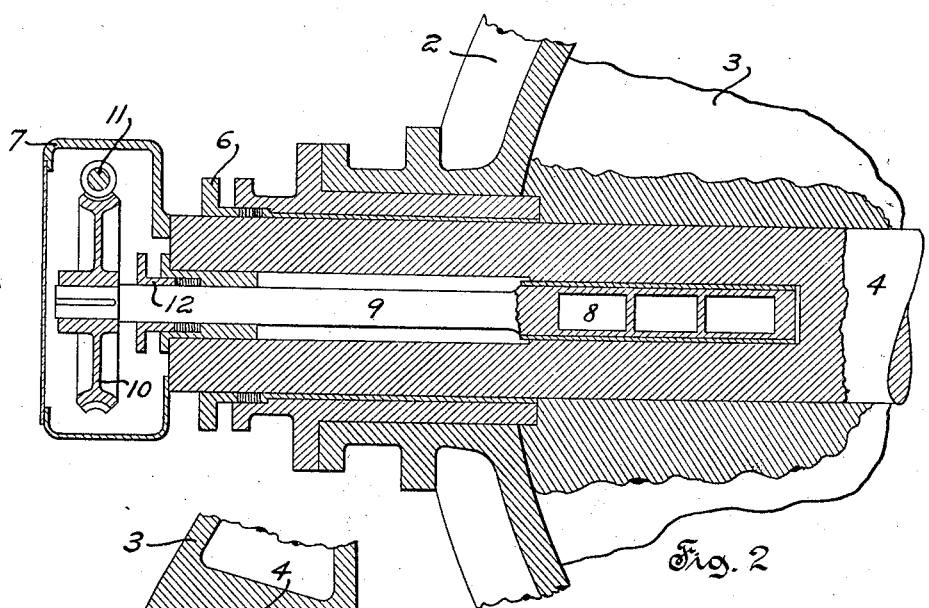
Fig. 2 is an enlarged fragmentary sectional view through the improved by-pass and auxiliary control valve for butterfly valves.
Figure 3:
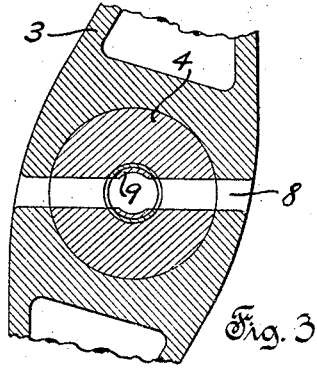
Fig. 3 is an enlarged fragmentary sectional view through the improved by-pass structure, the section being taken transversely through the main valve body.

The valve structure disclosed in Fig. 1 comprises in general a main casing 2, a wicket gate or butterfly valve 3 located within and adapted to normally control the flow of liquid through the casing 2, a pivot or stem 4 rotatably mounted in suitably packed bearings 6 at opposite sides of the main casing 2 and rigidly attached to the body of the butterfly valve 3, an actuating device 5 attached to one extremity of the valve stem or pivot 4 and capable of oscillating the valve 3, and mechanism for controlling delivery of liquid past the valve 3 without opening the same. The by-pass mechanism comprises a through-opening 8 formed directly in the body of the main valve 3 adjacent to the axis of rotation thereof, a rotary auxiliary control valve 9 located within and concentric relatively to the main valve stem 4 and extending outwardly from the opening 8 beyond the end of the stem 4 through a suitable bearing and stuffing box 12, worm gearing 10, 11 for controlling the position of the auxiliary valve 9, and a casing 7 secured to the end of the main valve stem 4 and forming a support and an enclosing housing for the gearing 10, 11.

Assume the main wicket gate or butterfly valve 3 to be in closed position with liquid under pressure coacting with the inlet face thereof, and with the space adjacent to the discharge face of the valve vacant. With the valve thus set, if it is desired to open the same, the auxiliary rotary valve 9 may be readily manipulated from the exterior of the casings 2, 7 with the aid of the worm gearing 10, 11, to establish communication between the opposite sides of the valve 3 through the opening 8. When such communication has been established, liquid flows through the opening 8 and gradually fills the space at the discharge side of the valve 3. After the space at the discharge side of the valve 3 has been thus gradually and substantially completely filled, the valve 3 may be gradually opened to the desired extent by manipulating the actuating device 5. Due to the fact that substantially equal pressure has previously been established on opposite sides of the valve 3 by the delivery of liquid through the opening 8, opening of the main valve 3 will not be accompanied by shock or water hammer. After the main valve 3 has been opened, the auxiliary valve 9 may again be closed either while the main valve 3 is in open or closed position.

It will be apparent that with the by-pass arrangement herein illustrated, a simple and compact construction which may be manufactured at minimum cost, is obtained. The auxiliary control valve 9 may be conveniently operated at all times and may be readily removed and assembled. The improved construction eliminates the use of piping and joints which are subject to leakage and requires no space additional to that occupied by the main valve and casing. The direct through-opening 8 prevents clogging due to the accumulation of débris and insures provision of a by-pass opening at all times. While a rotary valve 9 has been illustrated as controlling the opening 8 in the main valve 3, it will be obvious that other types of valves may be utilized. The disposition of the valve 9 within the pivot stem 4 of the butterfly valve 3 provides protection for the by-pass valve and eliminates danger of inoperativeness, although such location of the valve 9 is not essential.

It should be understood that it is not desired to limit the invention to the exact details of construction and of operation herein shown and described, for various modifications if within the scope of the claims may occur to persons skilled in the art.

It is claimed and desired to secure by Letters Patent:

1. In combination, a casing, a butterfly valve within said casing, a pivot stem about the axis of which said valve is movable, and means disposed entirely within said stem for controlling the flow of fluid directly through said valve.

2. In combination, a casing, a butterfly valve within said casing, and an auxiliary valve for controlling the flow of fluid directly through the body of said butterfly valve, said auxiliary valve when open being disposed entirely within the body of said butterfly valve.

3. In combination, a casing, a butterfly valve rotatable about an axis within said casing, and an auxiliary valve rotatable about said axis to control the flow of fluid directly through the body of said butterfly valve, said auxiliary valve when open being disposed entirely within the body of said butterfly valve.

4. In combination, a casing, a pivot stem within said casing, a main valve rotatable about the axis of said stem, and an auxiliary valve disposed entirely within said stem for controlling the flow of fluid through said casing.

5. In combination, a casing, a butterfly valve within said casing, a pivot stem for moving said valve about an axis, said stem having an opening therethrough adjacent to said axis, and an auxiliary valve disposed within said stem for controlling the flow of liquid through said opening.

6. In combination, a casing, a butterfly valve within said casing, a stem providing a pivot for said valve, said stem having a transverse opening therethrough, and a rotary valve disposed concentrically within said stem for controlling the flow of fluid through said opening to opposite sides of said butterfly valve.

7. In combination, a casing, a pivot stem within said casing, a main valve rotatable about the axis of said stem to control the flow of fluid through said casing, and an auxiliary valve disposed concentrically of and entirely within said stem for controlling the flow of fluid through said casing independently of said main valve.

8. In combination, a casing, a pivot stem within said casing, a main valve rotatable about the axis of said stem, an auxiliary valve disposed entirely within said stem, and means for independently operating said valves to control the flow of fluid through said casing.

In testimony whereof, the signature of the inventor is affixed hereto.

CHARLES R. MARTIN.